United States Patent
Corona et al.

(10) Patent No.: US 7,568,615 B2
(45) Date of Patent: Aug. 4, 2009

(54) ELECTRONIC TRANSFER OF HARD CURRENCY

(75) Inventors: Hector Corona, Chicago, IL (US);
Diane Corona, Chicago, IL (US);
Joanne H. Metoyer, Wheaton, IL (US);
James Bakopoulos, Park Ridge, IL (US)

(73) Assignee: E-Cash Financial, Inc., Chicago, IL (US)

(*) Notice: Subject to any disclaimer, the term of this patent is extended or adjusted under 35 U.S.C. 154(b) by 367 days.

(21) Appl. No.: 11/293,017

(22) Filed: Dec. 2, 2005

(65) Prior Publication Data

US 2007/0045395 A1    Mar. 1, 2007

Related U.S. Application Data (60) Provisional application No. 60/710,901, filed on Aug. 24, 2005.

(51) Int. Cl.
*G07F 19/00* (2006.01)

(52) U.S. Cl. ............ 235/379; 705/35; 705/39; 705/43; 705/44

(58) Field of Classification Search ............ 235/379; 705/35, 39, 43, 44
See application file for complete search history.

(56) References Cited

U.S. PATENT DOCUMENTS

| | | | |
|---|---|---|---|
| 5,650,604 A | 7/1997 | Marcous et al. | |
| 5,774,663 A * | 6/1998 | Randle et al. | ........... 709/204 |
| 5,953,710 A | 9/1999 | Fleming | |
| 6,045,039 A | 4/2000 | Stinson et al. | |
| 6,286,756 B1 | 9/2001 | Stinson et al. | |
| 6,397,198 B1 | 5/2002 | Hoffman et al. | |
| 6,578,760 B1 | 6/2003 | Otto | |
| 6,786,398 B1 * | 9/2004 | Stinson et al. | ........... 235/379 |
| 6,796,492 B1 | 9/2004 | Gatto | |
| 6,879,966 B1 | 4/2005 | Lapsley et al. | |
| 7,013,127 B2 | 3/2006 | Wills et al. | |
| 7,040,533 B1 | 5/2006 | Ramachandran | |
| 7,366,750 B1 * | 4/2008 | Brown et al. | ........... 705/45 |
| 2002/0082962 A1 * | 6/2002 | Farris et al. | ........... 705/35 |
| 2003/0080185 A1 * | 5/2003 | Werther | ........... 235/380 |
| 2004/0139000 A1 | 7/2004 | Amos | |
| 2005/0167481 A1 * | 8/2005 | Hansen et al. | ........... 235/379 |

* cited by examiner

*Primary Examiner*—Michael G Lee
*Assistant Examiner*—Kristy A Haupt
(74) *Attorney, Agent, or Firm*—McDonnell Boehnen Hulbert & Berghoff LLP (57) ABSTRACT

A method and system is described for person-to-person and person-to-entity cash-transfer via ATMs. Beneficially, at the system endpoints (cash in, cash out) the remitter and receiver can each interact with the system without requiring interactions with local operators and without having any pre-existing user accounts.

24 Claims, 9 Drawing Sheets

| |
|---|
| 952 Code for receiving an instruction for a user to being a cardless cash transaction |
| 954 Code for controlling reception of a deposit of cash in a cash input device |
| 956 Code for requesting and storing profile information |
| 958 Code for providing a confirmation code to the user |
| 960 Code for sending an indicator to a network server, the indicator including an indicia of the cash deposit and an indicia of the confirmation code |
| 962 Code for providing an interactive E-Teller session between the user and a live operator at a remote location |

ELECTRONIC TRANSFER OF HARD CURRENCY

CROSS REFERENCE TO RELATED APPLICATIONS

This application claims the benefit of U.S. Provisional Patent Application No. 60/710,901 filed Aug. 24, 2005.

FIELD OF THE INVENTION

This invention relates generally to person-to-person and person-to-entity funds transfers and more specifically to wholly and partially automated cardless cash transfers.

BACKGROUND

An automated teller machine (ATM) is an electronic device that allows a bank's customers to make cash withdrawals and check their account balances without the need for a human teller. Many ATMs also allow people to deposit money, transfer money between their bank accounts or even buy postage stamps. The first ATM was reportedly installed in London in 1967 by Barclay's bank. Today, ATMs are ubiquitous, with millions distributed throughout the United States and the world.

Many ATMs are associated with an individual bank. However, most ATMs are connected to an interbank network that enables customers to interact with money from machines not belonging to the bank where they have their account. Thus, a customer may take advantage of an entire network of ATMs even though the customer may have an account at only one bank.

In most modern ATMs, the customer identifies him or herself by inserting a plastic card with a magnetic stripe that contains an account number. The customer then verifies his or her identity by entering a four-digit passcode that is known as a PIN.

For years, ATMs have been configured to accept envelopes containing deposits. However, only recently, ATM technology has improved so that ATMs can now count cash on deposit and accept cash deposits along with check deposits.

Current ATMs and banking systems are designed for individual users who are already registered participants in the system. I.e., the banking system is generally directed toward individuals with bank accounts, checking accounts, credit cards and/or debit cards. However, the population includes a large number of individuals who are not registered with a financial institution and who do not possess the necessary bank accounts to perform daily bank transactions. These people use cash for purchases, bill payments, and for their other monetary transactions.

The exclusive use of cash payments has a number of problems. First, sending cash through the mail is highly discouraged because the cash may be stolen before reaching its destination, the mailing takes time to be shipped and may arrive late, and the sender is not provided with any receipt. (Even if the sender receives a receipt confirming delivery, the receipt does not prove that the necessary amount of cash was in the mailing). Thus, cash transactions are currently conducted face-to-face. However, face-to-face transactions require the person paying to be present—often a difficult task when the payer works a full-time job or in emergencies. Yet, late payment of taxes or utilities may result in service interruptions. In addition, quite often, the payer will have a need to transfer funds to a remote location such as another city or even another country that may be thousands of miles away.

A payer may use a non-bank financial institution, such as Western Union, to send money that is urgently needed to accommodate the beneficiaries' immediate needs such as to pay for food, education, books, and college tuition. The non-bank financial institution provides some convenience by remaining open later than normal banking hours and may allow transactions to be conducted without a standing account. However, the user is still bound by the working hours of the non-bank financial institution, long lines, higher fees due to the personal service and product monopoly, lack of competition due to the barriers to entry, potential lack of security, poor customer service, and lack of support for multiple languages. In addition, there is usually a longer time window needed to conduct the payment of funds and transfer of cash with the non-bank financial institution. Barriers also exist on the receiver-end. For instance, the receiver will need to wait in line to present a confirmation number sent to them by the payer. If the confirmation number is wrong then they will not get their money. Tellers can type in the wrong confirmation number even though the receiver of funds has the right number. Language barriers often further exacerbate this problem. With these and other issues in mind, a real need exists for a new cash transfer and payment system.

SUMMARY OF THE INVENTION

A method and system is described for person-to-person and person-to-entity cash-transfer via ATMs. Beneficially, at the system endpoints (cash in, cash out) the remitter and receiver can each interact with the system without requiring interactions with local operators and without having any pre-existing user accounts.

In an exemplary embodiment, a remitter arrives at a first automated teller machine (ATM) with cash in-hand, but perhaps without any pre-existing user account with the first ATM, any bank associated with the first ATM, and perhaps with any bank at all. The first ATM is thus configured to interact with the remitter through user inputs and user output devices, such as a screen, keypad, speaker, microphone, etc., to facilitate a "cardless" cash transaction. I.e., a cash transaction that does not require that the remitter have a financial card.

At the first ATM, the user may initiate the cardless cash transfer by, for example, pushing a predetermined button on the first ATM or by other action. The remitter may then work through a series of prompts at the ATM until ultimately providing a deposit of the cash in a hopper or other cash receiving device. The ATM, in turn, counts the cash deposit and provides the user with a confirmation code that may serve as a pass code for the receiver. The remitter may provide many types of information to the first ATM during the transfer, including information about the remitter, the receiver or other payee, a payment structure or schedule, and receipt locations, for instance.

The first ATM communicates information regarding the cash deposit to a network server that creates a temporary cash account that is an electronic account and serves essentially to hold the deposit in trust until it is removed by the receiver or by other means. The network server may also be aware of the confirmation code that may be used as a key or passcode for accessing the account or monies therein.

The network server may also be communicatively coupled with a network for providing access to a plurality of user end-points for receiving the cash transfer. The network may be an interbank network that provides access to a large plurality of end-points such as ATMs, banks and other sources.

A second ATM may be accessible to the receiver and may allow the receiver to begin a cardless cash receipt transaction without the receiver having a pre-existing account. At the second ATM, the receiver may provide identification information, including the confirmation code and perhaps including other materials like a name, an identification card, etc. This identification information is used to identify and access the temporary cash account through the network and to provide a cash output to the receiver.

In addition to being available for a cash receipt, the cash deposit may, at the instruction of the remitter, be made available for other purposes and may be transferred to other accounts or mailed to pay bills. Potential uses for the system would include transferring money, paying bills, paying rent, sending money to college, gifts, etc. Although not required, customer profiles may be stored so that full data is not re-entered each time.

The present disclosure also provides the electronic transfer of cash utilizing an interactive "ATM E-Teller" professional (human operator) that operates from a remote location (such as a central base) and that is activated via the ATM and seen on a display of the ATM for interactively initiating a cardless financial transaction at a first ATM or for receiving funds at a second ATM (domestically or internationally). The interactive "ATM E-Teller" professional may instruct senders and receivers in their own language from the ATM Machine anywhere in the world.

Additional features and advantages of the invention will be set forth in the description which follows or will be understood by persons having ordinary skill in the art. The objects and advantages of the invention may be realized and obtained by means of the instrumentalities and combinations particularly pointed out hereinafter. The invention itself, however, is defined by the claims.

DETAILED DESCRIPTION OF THE DRAWINGS

This disclosure addresses several problems with a unique program, system, and process to provide for secure and user-friendly fund transfers. An exemplary embodiment of the present invention builds on capabilities of the Automated Teller Machine (ATM) system. The system embodiment would reside on top of the current ATM network, although certain embodiments would require installing new ATM capabilities and ATM network capabilities.

The embodiment transforms the basic ATM into a fully serviceable banking station that helps a cash remitter to process cash transfers, utility payments, mortgage payments, rent payments, tax payments, insurance payments, credit card payments, and international funds transfers via the "ATM E-Teller" functions and/or additional technology provided.

It is expected that the embodiment will be used for the purpose of transferring cash from one ATM to another ATM and/or for making specific payments desired by the sender of cash. The specific payments, for instance, may include the remitter making a rent payment, tuition payment, insurance payment, utility payment, child support, tax payment, etc. One or more network entities may be responsible for accounting, system, database storing, retrieving, and archiving of customer information, including both public and private information. Of course, the information must be supplied by the owners of the information—likely during ATM transactions. The network entities may also be responsible for system connections and processes for facilitating the dialogue between an ATM E-Teller professional and a customer at the ATM.

In an embodiment, the ATM E-Teller professional is a live person who may talk and assist a customer from a central location and who can facilitate customer service via the ATM Network. This method can provide greater flexibility, faster service, round-the-clock availability, and more security than traditional banks or local money transmitters. Allowing a customer to talk with an ATM E-Teller professional when conducting a transaction will also be helpful for customers when problems arise at an ATM.

I. ATM E-Teller

A pool of "ATM E-Teller" professionals who are knowledgeable in the functions of the cash transfer system may be at a central location. A person using an ATM may then take advantage of the E-Tellers through user inputs and user outputs of the ATM. These ATM E-Tellers may also have access to a database of preloaded customer profiles to further facilitate the processes of assisting customers.

When the remitter begins at an ATM, the ATM provides information regarding the ATM E-Teller and regarding initiation of a cash transaction. When a connection is established, the ATM E-Teller professional may talk with the remitter in the language of the remitter. The remitter may provide information about themselves and about the beneficiary of the cash transfer. In various embodiments, the ATM E-Teller professional may interact with the remitter through the ATM.

The remitter once providing all of the pertinent information to properly send money may receive either an on-line confirmation of the stated information or a printed confirmation at the primary ATM (initiating ATM Machine). The remitter may then be given an opportunity to modify information through the ATM E-Teller who will make the appropriate changes. Otherwise, the next step may be for the remitter to deposit cash into the ATM Machine. Once the amount is deposited the ATM E-Teller will print a confirmation of all of the information provided by the sender and the amount of money sent. The confirming receipt may have a unique alpha/numeric identification number that is created by the system, utilizing the information the sender provides. This identification number is preferably a unique identification number used solely for the instant transaction. The unique number may be important because once the number is provided by the beneficiary to the ATM E-teller professional, that number may be used to access the cash for the beneficiary—from anywhere around the world. In addition, the ATM operator may be able to initiate a digital picture of the beneficiary and send it to the sender for release of a transaction. Alternatively, an identification of the beneficiary may be scanned by the ATM and thus provided to the remitter or stored for later use. Once the identification number is given and proper identification has been provided, the ATM can direct cash to be released from any ATM around the world.

In an embodiment, each ATM may be configured as both a cash collection station and cash disburser via the controls of the "ATM E-Teller" or as otherwise described herein. As such, disclosed herein are both the interface that a customer may use to interact with the ATM and the back-office functions that may be necessary to complete the system functions.

Further functions of the ATM E-Teller include controls at the operator's device that allow initiation of a print-out (either at the ATM or operator device) of the stored information for review. In an embodiment, the user may be required to explicitly authorize such an action. The operator can also control user output functionality at the ATM such that, for instance, the operator may cause user information to be displayed on an ATM screen—including a first and last name of the beneficiary, beneficiary invoice number, beneficiary telephone number, and/or beneficiary location, for example. This information may be used for verification (e.g., to match information from a central customer/payment database).

In another embodiment, the E-Teller operates through a virtual avatar that is viewable on the ATM screen. The virtual avatar may use (intelligent) software to guide the user through the cash transfer process. The avatar may include audible input mechanisms for allowing voice operation by the user.

II. Operation of the System from a User Perspective

Figure 1:
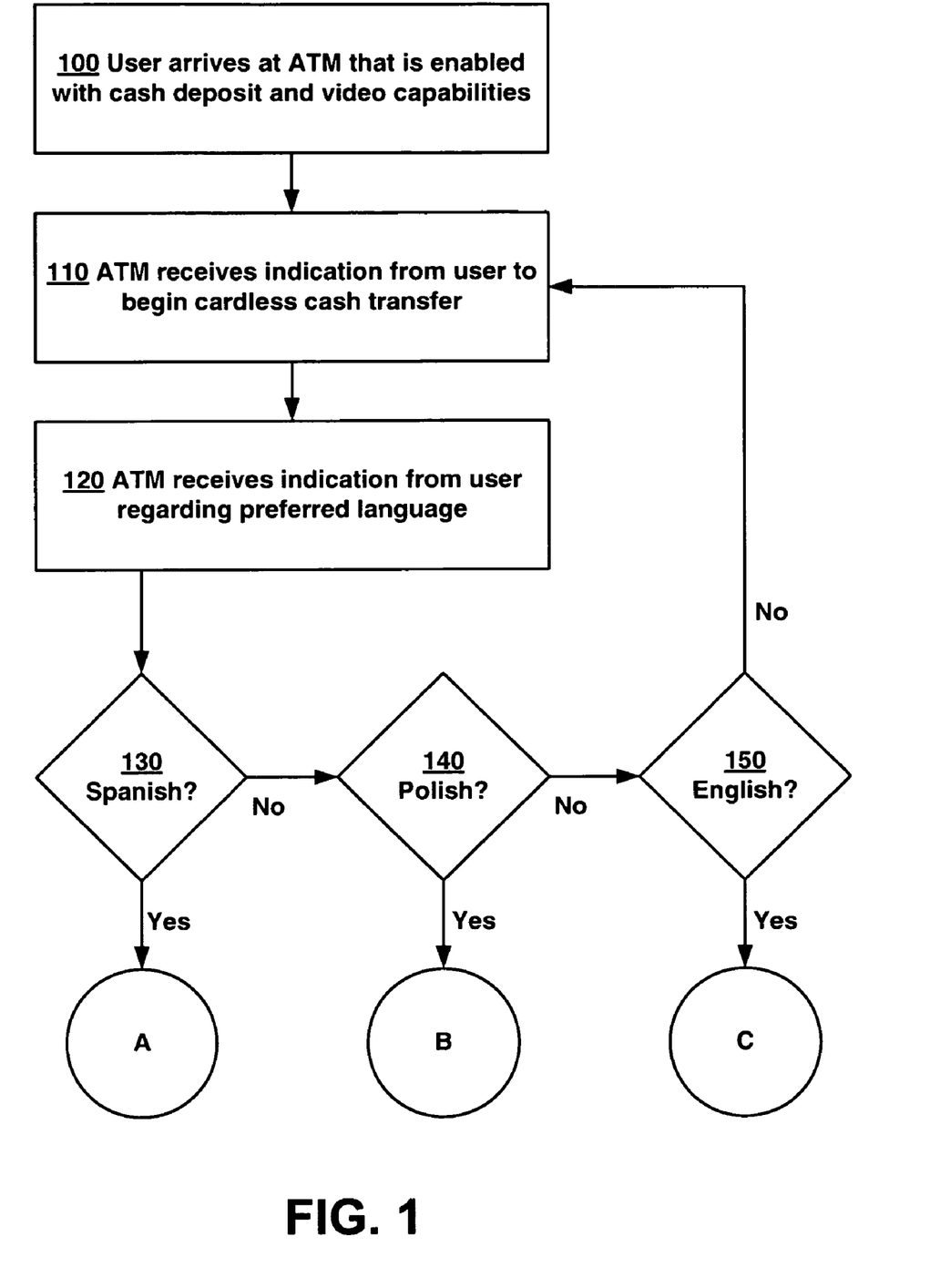
FIG. 1 is a first flow chart that shows operation of an embodiment of a cash transfer system.

FIGS. 1-4 provide a series of flow charts that show operation of an embodiment of the cash transfer system. In FIG. 1, a sender or remitter proceeds to a first automated teller machine (ATM) that may be enabled with video and cash deposit capabilities (100). In the embodiment, the first ATM is configured with software and hardware to handle cardless cash transfers. The remitter may then provide an indication to the first ATM to begin the cardless cash transfer. (110). The indication may, for instance, be that the remitter selects a "cash transfer" button available on a user-input of the first ATM. The remitter may also have the option of language selection. Three languages are indicated in the drawing, but the selections are not limited to Spanish (130), Polish (140), and English (150). The selected language may be configured only to affect the language displayed or communicated to & from the remitter. Thus, the general operating process of the system may be substantially the same regardless of the language selected.

Figure 2:
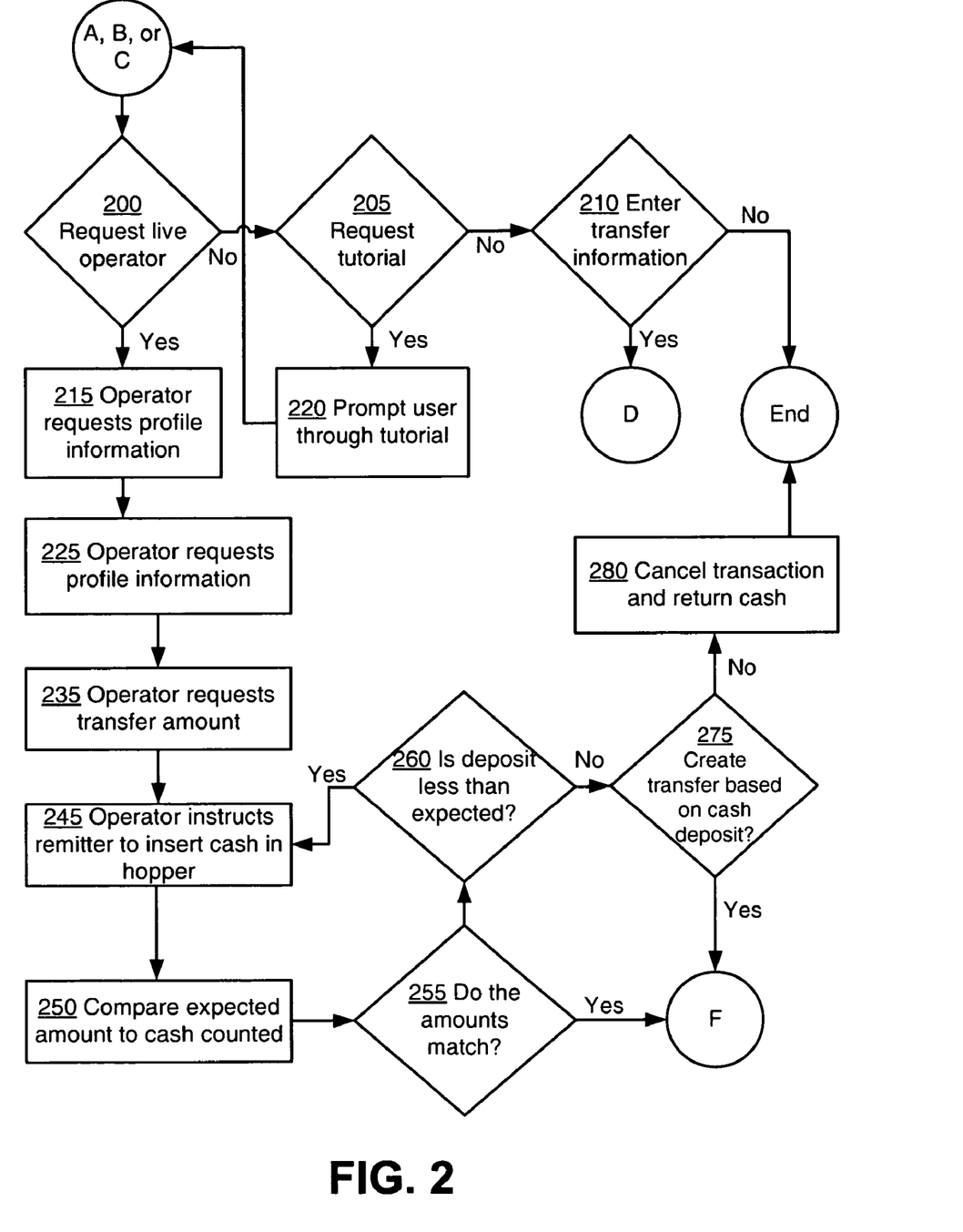
FIG. 2 is a second flow chart that shows operation of the embodiment of the cash transfer system.

At FIG. 2, the remitter may request a live operator to facilitate the transaction. (200). If the remitter requests a live operator (i.e., the E-Teller option), then an operator takes control of the remainder of the transaction session and the following sequence of events takes place beginning at (215). Of course, the live operator provides a unique system flow with more variability than a fully automated system. Beneficially, the live operator may better facilitate operation because of the ease of communication in human-human interactions as compared to human-machine interactions. A typical system flow involving the human operator may be as follows:

The operator will request that the remitter set up sender and/or receiver profiles (215) unless they already exist in a database (e.g., the centralized database). In order to set the profiles, the operator requests name, address, phone number, and optional account number to complete the remitter's and receiver's profile in the database (225). The remitter is then instructed to enter the transfer amount (235). The operator instructs the remitter to insert the money into the hopper (245), which will count the bills. The first ATM then counts the money. The amount entered is matched to the amount that the ATM counted (250). If the amounts match (255), an (encrypted) confirmation number is created—perhaps a unique number based on receiver profile, timestamp and amount in order to be printed on a (paper) receipt. If the cash deposited in the hopper is less than the amount keyed-in, the operator asks if the remitter would like to deposit more cash (265). The remitter deposits more cash into the hopper (270) and the amount verification process (255) is repeated. If the cash deposited in the hopper is greater than the amount keyed-in, the remitter is asked if they want to create a transaction for the amount of cash deposited. If the remitter does not want to create a transaction based on the amount of cash entered, then the transaction is cancelled and the cash is returned (280).

At the step where the remitter is asked if they want operator assistance (200), they also have a choice of walking through a brief tutorial (205) or entering the information themselves (210). By selecting a tutorial, the first ATM prompts the remitter through a tutorial on use of the system as embodied by the first ATM (220). If the remitter selects to enter the information without operator assistance the following sequence of events would take place.

Figure 3:
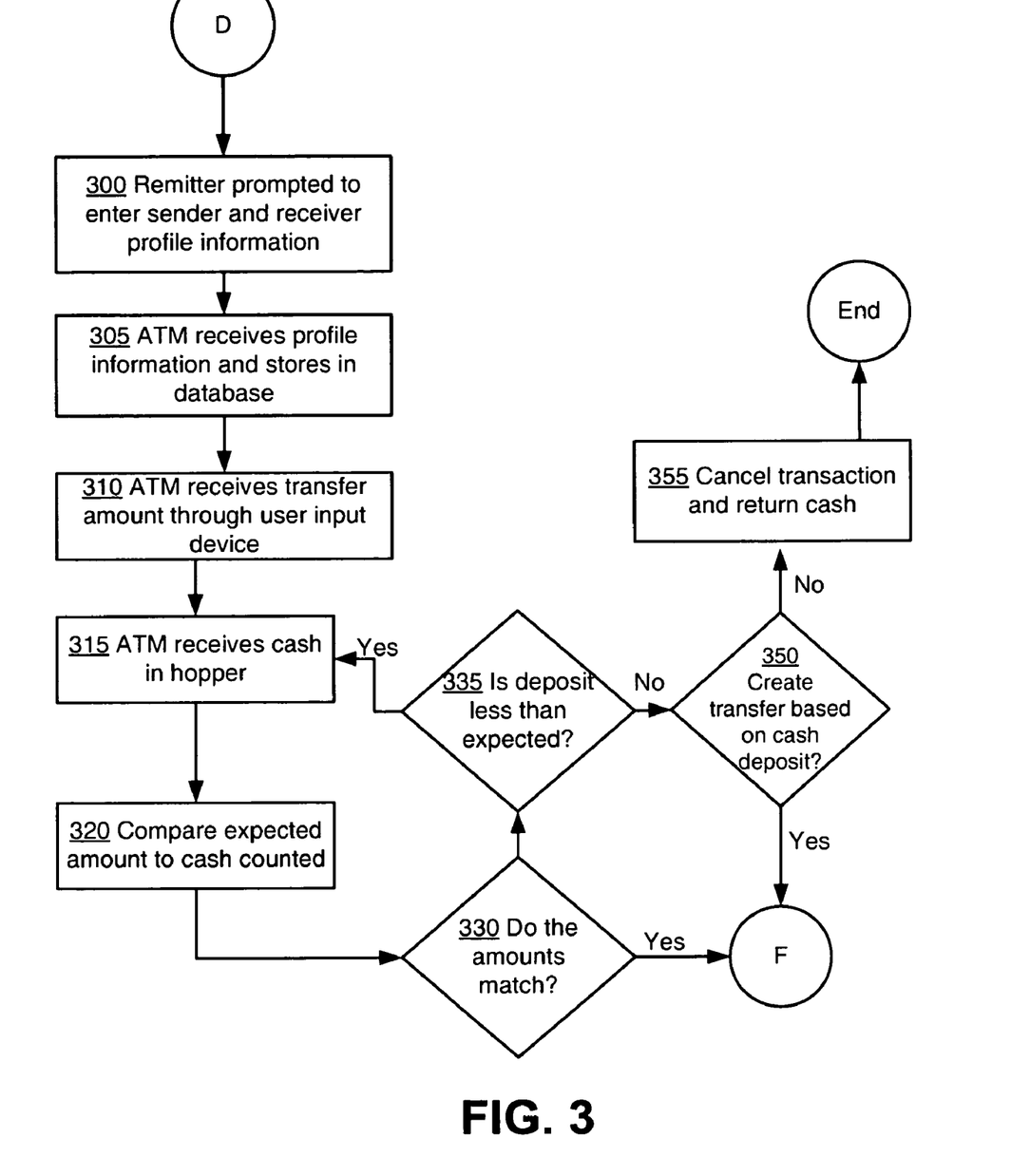
FIG. 3 is a third flow chart that shows operation of the embodiment of the cash transfer system.

FIG. 3 continues the operation flow-chart in the case where the remitter chooses to enter information themselves without the assistance of the live operator. The remitter may be prompted to set up sender and/or receiver profiles (300) unless they already exist in a database. In order to set up the profiles, the remitter may enter name, address, phone number and optional account number to complete the remitters' and receiver's profile in the database (305). In some embodiments, this information may be required to conform with applicable laws. In addition, the system may be configured with a digital imaging tool (e.g., digital camera and software) to obtain digital images of identifying information such as a state identification, a credit card, a barcode receipt, a driver's license I.D., a Domestic or Foreign Passport, a utility payment bill, a credit card bill, a mortgage payment bill, a rent contract, an insurance payment, a tax bill, a traffic violation ticket and any other bill that can verify the remitter information. Alternatively, the first ATM may take a digital photograph of the remitter for storage and for later verification if needed.

The remitter may then be prompted to enter the amount of the funds transfer (310). The remitter deposits the cash into the hopper (315), which will count the bills. The "cash deposit capable ATM" then counts the money. The amount entered is matched to the amount that the ATM counted (320). If the amounts match (330), an encrypted confirmation number is created based on receiver profile, timestamp and amount in order to be printed on a receipt. If the cash deposited in the hopper is less than the amount keyed-in (335), the remitter is prompted to deposit more cash (315). The remitter deposits more cash into the hopper (315) and the amount verification process (330) is repeated. If the cash deposited in the hopper is greater than the amount keyed-in, the remitter is prompted to create a transaction for the amount of cash deposited. (350) If the remitter does not want to create a transaction based on the amount of cash entered, the transaction is cancelled and the cash is returned. (355).

Figure 4:
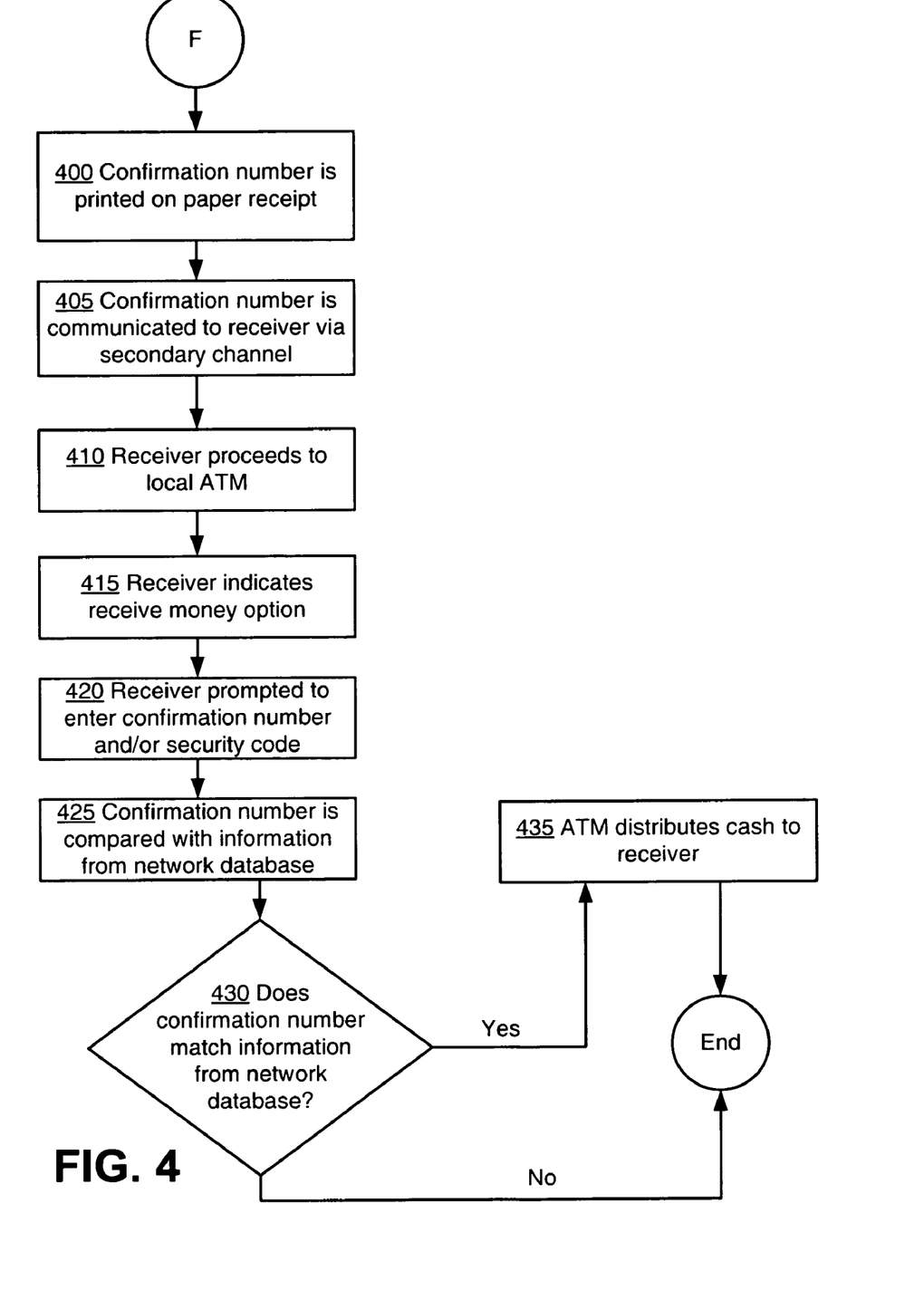
FIG. 4 is a fourth flow chart that shows operation of the embodiment of the cash transfer system.

FIG. 4 continues the operation flow. At the first ATM, a confirmation number is printed on a paper receipt (400). The remitter will then communicate the confirmation number to the receiver (405). The receiver will then proceed to a local ATM (410). The receiver will select the "receive money transfer" option at the ATM (415). The receiver will be prompted to enter the encrypted confirmation number. The encrypted number will be compared to the computer generated encrypted confirmation number (425). If the numbers match (430), the ATM disperses the money (435). If the money is requested in a foreign currency, the system may need to provide foreign exchange quotes and interact with third-party financial institutions to have foreign exchange currency readily available to the recipient of the cash transfer. The system may link the foreign exchange rate for the day to the home currency and assign it to an international transaction. As such, the system may convert US dollar payments into foreign currency payments. In general, a network entity may calculate an appropriate exchange rate.

The local currency of the receiver ATM will preferably be used when providing cash to the receiver. Thus, if the ATM is in Poland then the receiver will receiver Polish currency. If the ATM is in the U.S. then the receiver will receive US Dollars or if the ATM is in Mexico then the receiver will receive Pesos.

III. Customer and Payee Profiles:

On the network side, the creation and utilization of a centralized database can allow for tracking of users and transactions via customer profiles and thus allow for compliance with government regulations and match their customer list to the current Office of Foreign Asset Control (OFAC) list. The customer profiles could be used for the following as well as other uses:

Landlord and tenant profiles—A landlord can set up a profile with a receiving account for rent payments. The landlord could require their tenants to set up a sender or remitter profile so that they need not have to physically collect rent each month. The renter could deposit cash at an ATM and have the funds deposited directly into the landlord's bank account.

Customer profiles and Automatic Clearing House (ACH) deposits directly into receiver checking accounts—A customer sending cash funds can now have the funds deposited directly into another person's bank account. Phone ACH money transfers and payments—A customer paying a bill or sending money could pay any of their bills from any location by using a telephone.

Bill payment profiles—By creating bill payment profiles, a customer would have many of the same bill payment capabilities as a person using inline Internet banking without owning a PC.

Money transfer profiles for senders and receivers—This allows people to consistently transfer funds to the same receivers, and have the convenience of having profiles set up and available to use for quick transactions.

In yet another embodiment, the system is configured to allow the remitter to schedule payments at a later date during the transfer setup. In addition, the schedule may allow for multiple payments to one or more recipient—each payment only disbursing a part of the entire fund. Once a partial payment is made, the system may store information for the next scheduled payment (e.g., remaining funds) and deduct the partial payment from the balance in a temporary fund. A notice may be delivered to the remitter after a first partial payment indicating an updated payment structure.

IV. Exemplary Architecture

Figure 5:
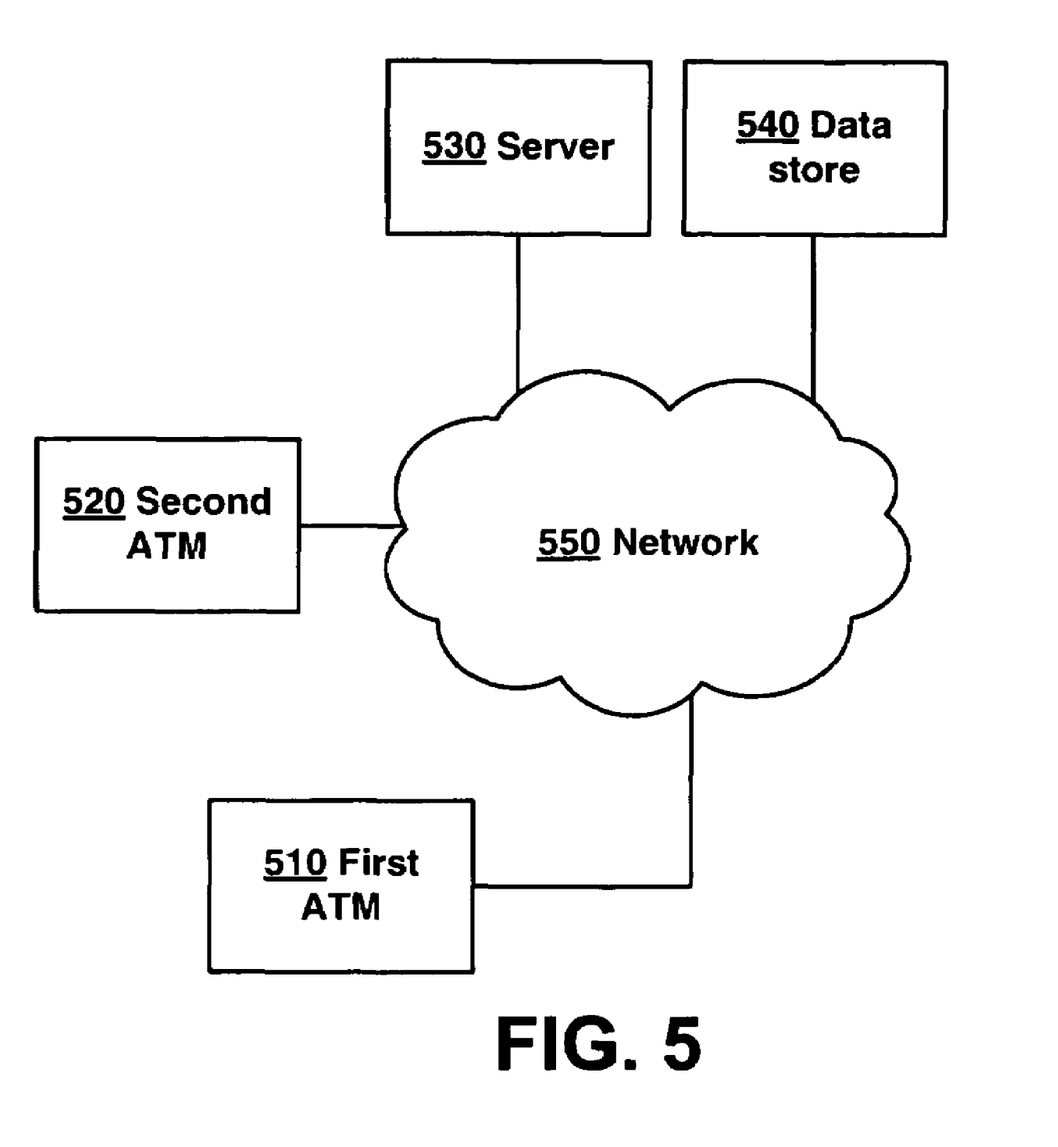
FIG. 5 is a block diagram of an exemplary embodiment of a system architecture.

FIG. 5 is a block diagram of an exemplary embodiment of a system architecture. A first automated teller machine (ATM) 510 is communicatively connected to a network 550, such as an interbank network or IP network. A second ATM 520 is also communicatively coupled to the network 550. A server 530 may be one or more computers or processors communicatively coupled with the network 550 for serving as an intermediary during cash transfers, such as a transfer from a user at the first ATM 510 to a user at the second ATM 520. A data store 540 may provide storage for operation of the server 530 and may be communicatively coupled to the network 550 either on its own or through the server 530 (not shown).

In the embodiment, the first ATM 510 may be configured for interacting with a first user through user inputs and outputs on the first ATM. The first ATM 510 may also include a cash receiver for receiving cash and for counting a cash deposit received from the first user without requiring that the first user have a pre-existing account. The first ATM 510 may also include program code stored on a machine readable device (such as a data store in the first ATM 510). The program code may provide functionality for the first ATM to control reception of cash transfer instructions from the first user (e.g., instructions for how the transfer should proceed) and delivery of a transfer confirmation (e.g., confirmation code) to the first user.

The server 530 may be configured to create a temporary cash account based on receiving an indication of the cash deposit from the first ATM 510. A preliminary temporary cash account may be created at the server when the first user at the first ATM 510 begins the cash transfer process, and then the temporary cash account may be finalized when the server 530 receives an indication from the first ATM 510 that the first user has completed his or her portion of the cash transfer. The server 530 may also receive an indication of the transfer confirmation from the first ATM 510.

The second ATM 520 may be configured to allow a second user to obtain a cash output within parameters set by the cash transfer instructions from the first user at the first ATM 510 without requiring the second user to have a pre-existing account. The second ATM 520 is configured to verify that the second user is an intended receiver of the cash output and, upon verification, to provide the cash output.

Figure 6:
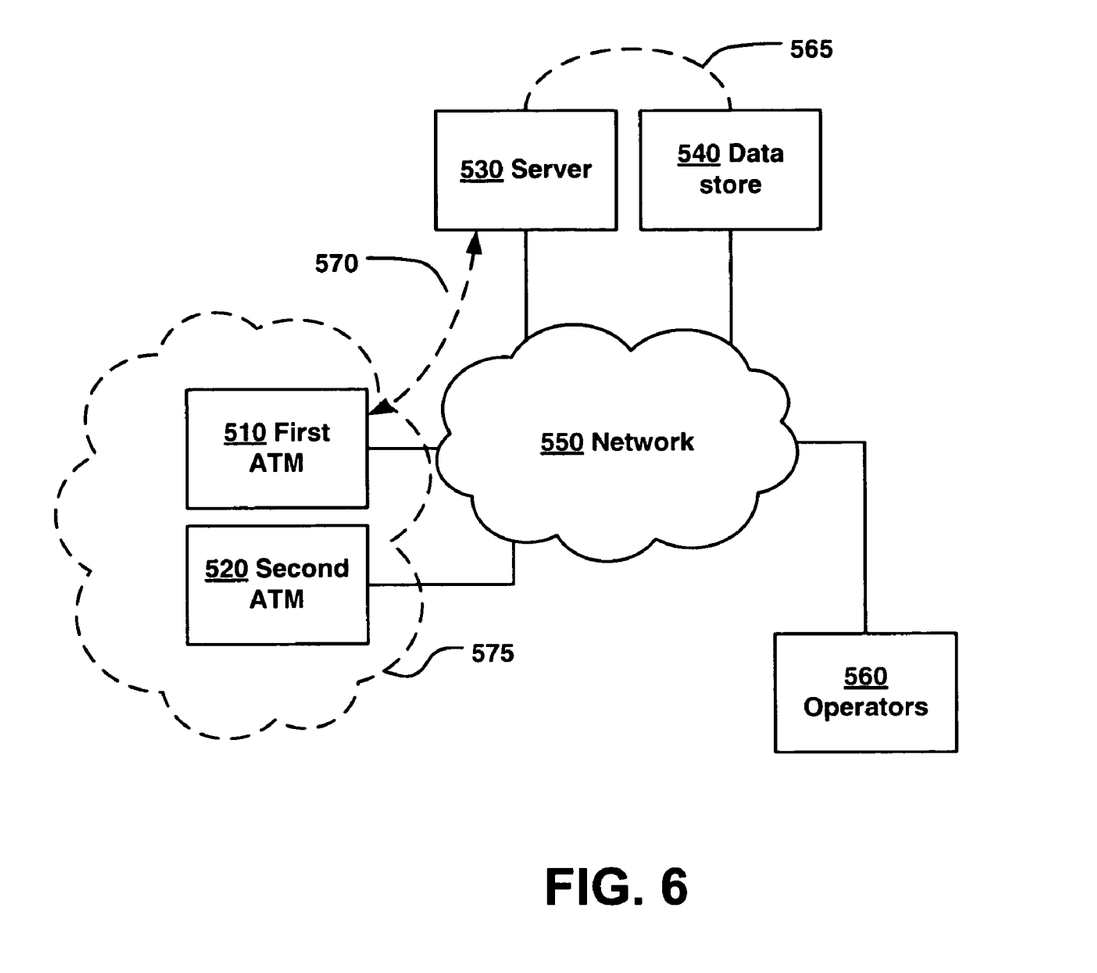
FIG. 6 is a block diagram of a further embodiment of a system architecture.

FIG. 6 is a block diagram showing a further embodiment of a network architecture. The network 550 may be coupled with a first ATM 510, a second ATM 520, a server 530, a data store 540, and an operator device 560.

As shown, the first and second ATMs 510, 520 may be part of a network of end-point devices 575 that may include any number of ATMs, cash stations, banks, and other locations where a user may either provide a cash deposit or receive a cash transfer. In a further embodiment, a larger network of end-points (not shown) may also include bill payment systems, bank accounts, ACH accounts, etc.

If the server 530 is closely associated with the first ATM 510 then there may be a more direct connection 570 between the two network elements. As an example, the server 530 may be associated with the same bank as the first ATM 510 and the two may have a direct communication link. Alternatively, or further, the communication link 570 may represent a secure tunnel to allow secure communication between the first ATM 510 and the server 530. Similarly, a direct communication link 565 is shown between the server 530 and the data store 540.

The operator device 560 may be an end-point computer that allows a live operator at a remote location to interact with users at the first and second ATMs 510, 520. In an embodiment, the operator device 560 includes a digital video camera and audio recorder for capturing a voice and video output from the live operator to be displayed/outputted at the respective ATM. (e.g., via streaming video). In the preferred embodiment, equipment at the respective ATM coupled with the network 550 and the operator device 560 allow for an interactive communication between a user (customer) and an operator.

Further, the operator device 560 may allow the live operator to control aspects of the user ATM session. For instance, the user may indicate to the live operator an amount of cash that will be deposited. The live operator may then enter that amount into the operator device 560, and the amount may then be sent via a packet network back to the ATM.

Systematically, the server 530 creates a temporary account for the remitter that may be a sub account of the managing company's main account. As new remitters use the system, the server 530 creates sub-accounts for each individual transaction. Once the funds are liquidated, the accounts are purged from the system.

In a preferred embodiment, the accounts are on the system for no longer than 30 days and a remitter could then reclaim funds via a specific encrypted unique identifier word/number provided by the system when the transaction was generated from the system at the time of the initiation of the fund transfer.

V. Exemplary User Inputs and Outputs

Figure 7:
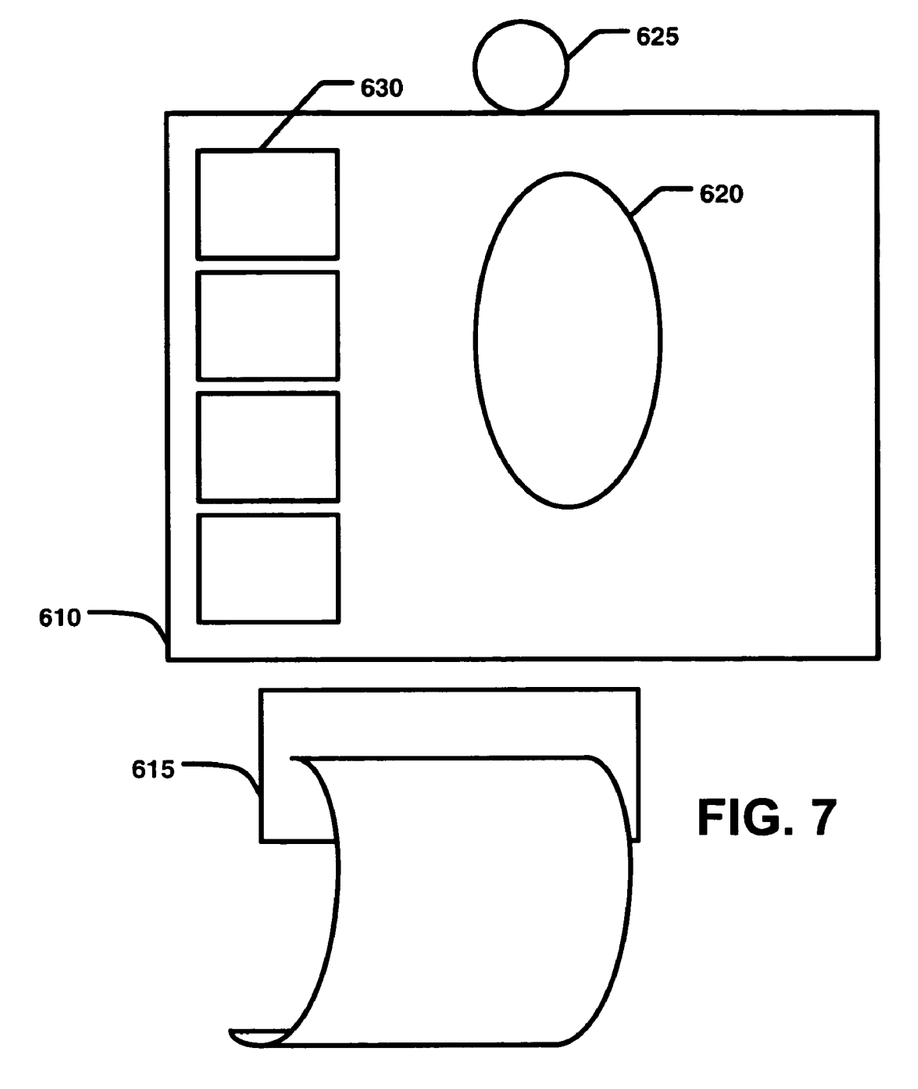
FIG. 7 is a schematic (cartoon) diagram of user inputs and user outputs at an ATM and a printer.
Figure 8:
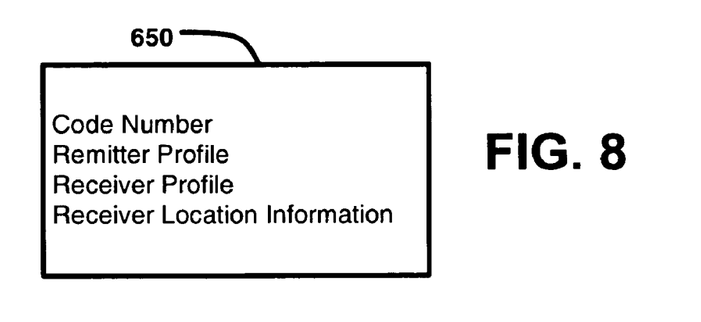
FIG. 8 is an embodiment of a hard-copy printout from an ATM.

FIG. 7 provides a schematic with exemplary inputs and outputs at an ATM. An interactive (touch-type) display 610 may provide functionality for interactions. A series of (virtual) buttons 630 may be positioned within the display 610 or at the side. The display 610 may also be configured so that an image or video of an E-Teller professional 620 is shown. A camera 625 may be configured for scanning, photography, and/or video that can be used in conjunction with a microphone (not shown). Thus, the camera 625 may be used to capture a digital picture of a user and send it to another user (e.g., photo of beneficiary sent to remitter). Alternatively, an identification of the beneficiary may be scanned by the camera 625 and thus provided to the remitter or stored for later use. A printer 615 is used to provide a hard-copy record to the remitter and/or receiver as described herein. An example embodiment of a hard-copy printout 650 for the remitter is provided by FIG. 8. In the hard-copy (paper) printout 650, a unique ID code (e.g., confirmation code) is provided along with at least some profile information for the remitter and/or receiver as well as information regarding the location that the receiver will receive the cash (e.g., city, state, and/or country). Of course each of these elements is optional and others may be included in the printout 650. A similar input/output profile may be used at both the receiver ATM and remitter ATM.

VI. Exemplary ATM

Figure 9:
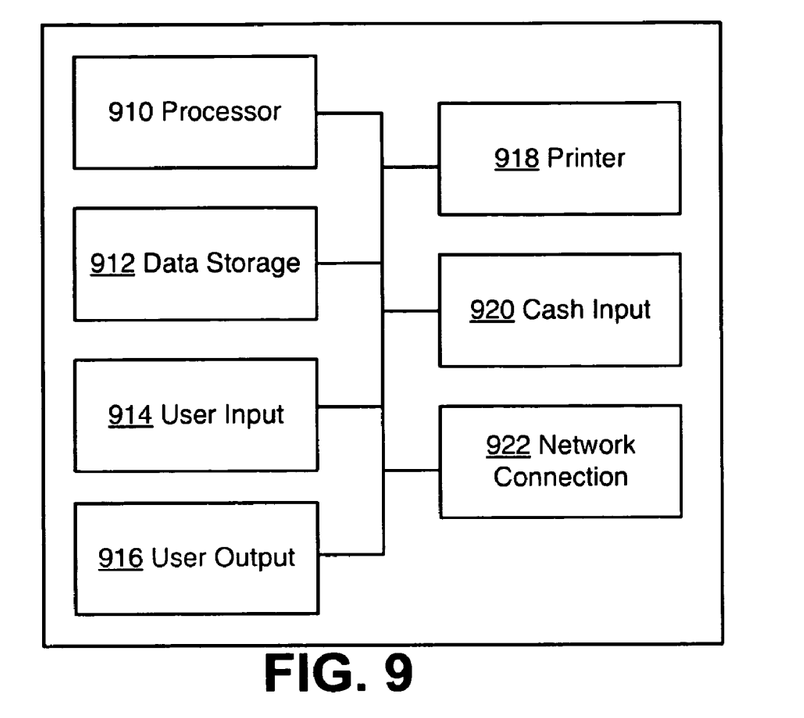
FIG. 9 is a block diagram showing an embodiment of an architecture of an ATM.

FIG. 9 provides a block diagram representing an exemplary embodiment of an ATM. A processor 910 is configured to execute software stored in data storage 912 to control aspects of the cardless cash transfer. The ATM further includes user inputs 914 and user outputs 916, a printer 918, a cash input 920 (hopper), and a network connection 922 for communicating with an external network such as an interbank network. A logical breakdown of a portion of the software stored in data storage 912 is provided in FIG. 10. The software includes code for receiving an instruction for a user to begin a cardless cash transaction (952). The instruction may be the user hitting a "cash transfer" button or another action taken by the user on the ATM. Alternatively, the indication may take other forms. The software further includes code for controlling reception of a deposit of cash in a cash input device (954). The reception of the deposit includes requesting information from the user as well as receiving the cash, counting the cash, and ensuring that the cash deposited is the same as that indicated by the remitter.

Figure 10:
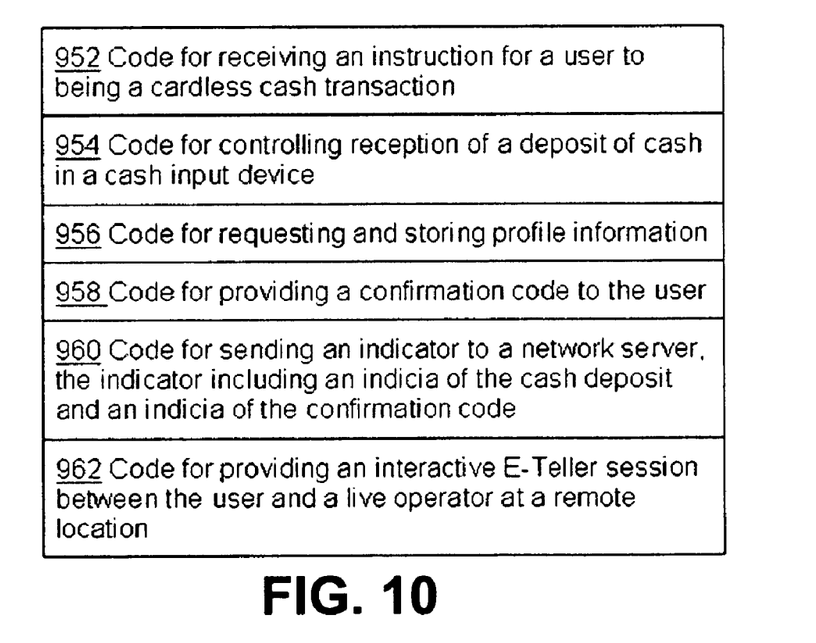
FIG. 10 is a block diagram showing an embodiment of a logical set of computer code (software).

The software may also include code for requesting and storing profile information (956). In the various embodiments, the user may enter profile information through any number of means including a keypad, virtual keypad through the display, audibly, scanned or other ways known to those skilled in the art. The user may provide profile information both for the user (payer) and for a beneficiary and any other payees. These data may be stored in a database, preferably on a network entity so that the data would be available at another end-point.

The software may also include code for providing a confirmation code to the user (958). The confirmation code may be calculated at either the ATM or at another network device, such as the network server. The confirmation code is preferably calculated as a unique identifier and provided to the user so that the user can provide the code to a beneficiary who can then use the code to access the monies from another location (through another ATM).

The software may also include code for sending an indicator to a network server, the indicator including an indicia of the cash deposit and an indicia of the confirmation code (960). The indicator may be used at the network server to open a temporary account and may also be used as a key for providing access to the account.

The software may also include code for providing an interactive ATM E-Teller session between the user and a live operator who is located at a remote location (962). As described herein, the live operator may provide assistance to the user in completing the cash transfer and may control user inputs so that the user can complete the cash transfer without having to key-in any data or other information (or at least only a limited amount).

VII. Operation of a Cash Transfer Transaction

Figure 11:
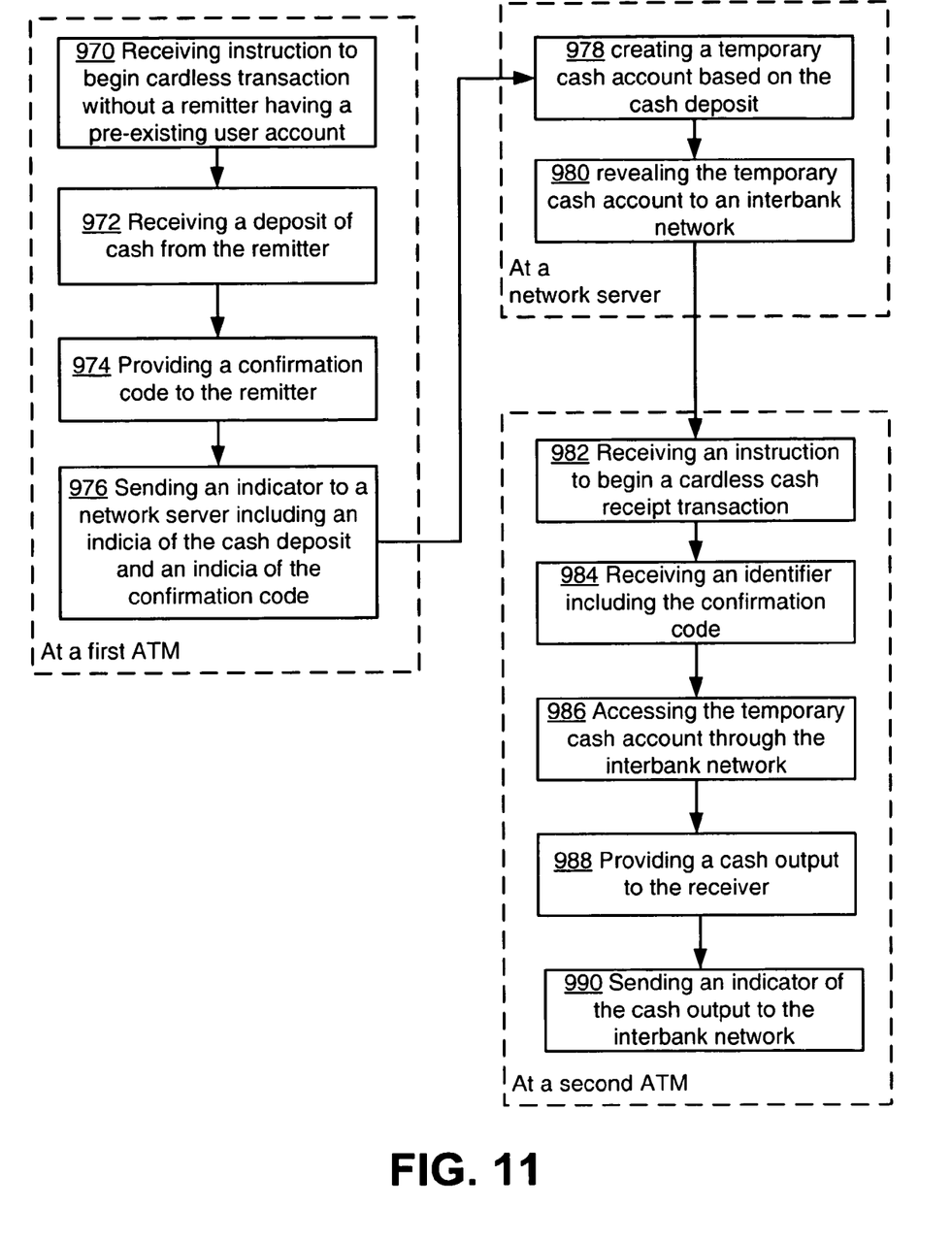
FIG. 11 is a flow chart showing operation of an embodiment of a cash transfer method.

FIG. 11 provides a flow chart of a cash transfer transaction. As with the other flow charts, some intervening steps are not shown. As such, the flow charts should not be used to limit the invention to a particular combination of steps or a particular ordering.

At a first ATM, the first ATM receives an instruction to begin a cardless transaction without a remitter being required to have a pre-existing user account (970). The first ATM then receives a deposit of cash from the remitter (972) and provides a confirmation number to the remitter (974). An indicator including an indicia of the cash deposit and an indicia of the confirmation code may be sent to a network server (976). In an embodiment, the indicator is sent in a two step process (or multi-step). In yet another embodiment, the confirmation code (and perhaps other information) is sent as an encrypted message. The encrypted message may be sent through the interbank network.

At the network server, the network server creates a temporary cash account based on the cash deposit (978). The temporary cash account may be in the name of the remitter or be given another alphanumeric identifier. The network server then reveals the temporary cash account to an interbank network (980). Revealing the temporary cash account to the interbank network allows other ATMs and third-party endpoints to access the temporary cash account and withdraw monies (once properly verified).

At a second ATM, the second ATM receives an instruction to begin a cardless cash receipt transaction (982). The cardless cash receipt transaction is initiated by a receiver to obtain at least a portion of the cash deposit deposited by the remitter at the first ATM. The second ATM then receives an identifier including the confirmation code from the receiver (984). The identifier is used to verify that the cash should be released to the receiver. In an alternative embodiment, other data or identifiers may be used for this same purpose.

The second ATM is then able to access the temporary cash account through the interbank network (986). Of course, during the access, the network server (or other entity) will guarantee that the second ATM should be given access to the temporary cash account. In an embodiment, access will be granted if the second ATM sends an encrypted confirmation code to the network server (via the interbank network). At that point, the network server may sent an indication of the temporary cash account to the second ATM (again via the interbank network). The indication of the temporary cash account may include an amount and an authorization to release cash up to the amount.

If the second ATM is able to access the temporary cash account, then it will provide a cash output to the receiver according to the instructions provided by the receiver and the limitations on the temporary cash account (988). When completing the transaction, the second ATM may provide an indicator of the cash output to the interbank network (990). The indicator of the cash output may be useful for the network server to close the temporary cash account or to provide a reporting to the remitter or other entity.

VIII. Conclusions

As will be apparent to one skilled in the art, many changes can be made to the described embodiments of the invention without departing from the scope thereof. It is intended that all matter contained herein be considered illustrative of the invention and not in a limiting sense. Parentheses are occasionally used within the description to indicate optional embodiments. For instance "an (encrypted) code" provides disclosure for a code that is encrypted in some of the embodiments.

We claim:

1. A method for facilitating cash transfer comprising:
   (a) at a first automated teller machine (ATM),
      (i) receiving an instruction to begin a cardless cash transaction, the first ATM being configured to interact with a remitter through one or more user input and output devices to facilitate the cardless cash transaction, wherein the first ATM is configured to facilitate the cardless cash transfer without the remitter having a pre-existing user account;
      (ii) receiving a deposit of cash from the remitter, wherein at the first ATM, the remitter provides a payment schedule that includes a payment structure including a plurality of partial payouts of the cash deposit to be available at the receiver at specified dates;
      (iii) providing a confirmation code to the remitter; and
      (iv) sending an indicator to a network server including an indicia of the cash deposit and an indicia of the confirmation code;
   (b) at the network server,
      (i) creating a temporary cash account based on the cash deposit; and
      (ii) revealing the temporary cash account to an interbank network;
   (c) at a second ATM,
      (i) receiving an instruction to begin a cardless cash receipt transaction, the second ATM being configured to interact with a receiver without the receiver having a pre-existing user account;
      (ii) receiving an identifier including the confirmation code;
      (iii) accessing the temporary cash account through the interbank network;
      (iv) providing cash output to the receiver; and
      (v) sending an indicator of the cash output to the interbank network.

2. The method of claim 1, further comprising upon receiving the deposit of cash from the remitter, the first ATM counting an amount of cash received.

3. The method of claim 1, wherein at the second ATM, the step of accessing the temporary cash account comprises:
   sending an encrypted confirmation code to the interbank network; and
   receiving an indication from the interbank network of the temporary cash account.

4. The method of claim 1 further comprising:
   at the first ATM, receiving receiver identification information from the remitter, the receiver identification information including a location selected from the group consisting of a city, state, and a country where the receiver will receive the cash output.

5. The method of claim 1 further comprising at a central pool of operators, assisting the remitter and receiver by utilizing prompts on the ATMs.

6. The method of claim 5 wherein the user input and output devices of the first ATM include an ATM e-teller provided on an ATM screen, the e-teller being configured to provide a display selected from the group consisting of a live video display of one of the operators in the central pool of operators and a virtual avatar.

7. The method of claim 6, wherein both the first and second ATMs include e-teller functionality available as an option during user interactions.

8. The method of claim 1, wherein data inputs provided by the remitter at the first ATM are captured, encrypted, and stored for system integrity.

9. The method of claim 1, wherein the ATMs are automated for electronic fund transfer without requiring any of a credit card, smart card, debit card, or pre-paid card.

10. The method of claim 1, wherein the first ATM includes a digital imaging tool for creating an image of an identifier of the remitter to verify remitter information.

11. The method of claim 10, wherein the identifier is a device selected from the group consisting of a state identification, a credit card, a barcode receipt, a driver's license I.D., a Domestic or Foreign Passport, a utility payment bill, a credit card bill, a mortgage payment bill, a rent contract, an insurance payment, a tax bill, a traffic violation ticket and any other bill that can verify the remitter information.

12. The method of claim 10 wherein the digital imaging tool is a camera for capturing a picture of the remitter, and further comprising transmitting the picture to the network server for storage.

13. The method of claim 1, the first ATM receiving an authorization from the remitter to allow the cash to be dispersed from any ATM or privately owned network.

14. The method of claim 1, wherein the user input and output devices of the first ATM include a voice input for providing an audible input.

15. The method of claim 14, wherein the voice input includes functionality for a live interactive conversation with an operator from a central pool of operators, and wherein the live interactive conversation may be conducted in one of a plurality of available languages.

16. The method of claim 1, wherein the second ATM providing a cash output to the receiver includes:
   determining a local currency of the second ATM;
   converting an amount to be distributed to the receiver to the local currency using an exchange rate; and
   providing the cash output in the local currency.

17. The method of claim 1, wherein claim 1, wherein a database on the network server is configured to store the payment structure.

18. The method of claim 1 further comprising generating a notice to be delivered to the remitter after a first partial payment indicating an updated payment structure.

19. A system for facilitating a cash transfer, the system comprising:
- a first automated teller machine (ATM) configured for interacting with a remitter through user inputs and user outputs, the first ATM including a cash receiver for receiving and counting a cash deposit from the remitter without requiring the remitter to have a pre-existing account and further including program code stored on a machine readable device for controlling (i) reception of a cash transfer instructions from the remitter and (ii) delivery of transfer confirmation to the remitter, wherein the first ATM is further configured to receive from the remitter a payment schedule that includes a payment structure including a plurality of partial payouts of the cash deposit to be available at a receiver at specified dates;
- a first sewer communicatively coupled with the first ATM, the first server configured to create a temporary cash account based on receiving an indication of the cash deposition and the transfer confirmation from the first ATM;
- a network communicatively coupled with the first server for providing access to a plurality of user end-points for receiving the cash transfer; and
- a second ATM configured for interacting with the receiver through user inputs and user outputs, the second ATM configured to allow the receiver to obtain a cash output from the second ATM within parameters set by the cash transfer instructions from the remitter to the first ATM without requiring the receiver to have a pre-existing account, wherein the second ATM is configured to verify that the receiver is an intended receiver of the cash output.

20. The system of claim 19 further comprising:
- a database accessible from the first ATM, the database being configured to store payee information for the remitter; and
- an input interface on the first ATM for allowing the remitter to select a payee from the database, wherein at least a portion of the cash deposit is transferred to the payee.

21. The system of claim 19 wherein the user inputs and user outputs of the first ATM include inputs and outputs for allowing a live conversation with a centrally located human operator.

22. The system of claim 21 wherein the human operator can see the customer via a digital camera at the first ATM.

23. The system of claim 21 wherein the remitter can see a streaming video of the human operator on a screen of the first ATM.

24. The system of claim 19 wherein the user inputs and user outputs further comprise a scanning device for generating a remitter identification image for verification.

* * * * *

UNITED STATES PATENT AND TRADEMARK OFFICE
CERTIFICATE OF CORRECTION

| | | |
|---|---|---|
| PATENT NO. | : 7,568,615 B2 | Page 1 of 1 |
| APPLICATION NO. | : 11/293017 | |
| DATED | : August 4, 2009 | |
| INVENTOR(S) | : Corona et al. | |

It is certified that error appears in the above-identified patent and that said Letters Patent is hereby corrected as shown below:

On the title page,

[*] Notice:   Subject to any disclaimer, the term of this patent is extended or adjusted under 35 USC 154(b) by 367 days.

Delete the phrase "by 367 days" and insert -- by 612 days --

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,568,615 B2  Page 1 of 1
APPLICATION NO. : 11/293017
DATED : August 4, 2009
INVENTOR(S) : Corona et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Fourteenth Day of December, 2010

David J. Kappos
*Director of the United States Patent and Trademark Office*